US00RE33899E

United States Patent [19]

Tyer

[11] E

Patent Number: Re. 33,899

[45] Reissued Date of Patent: Apr. 28, 1992

[54] FINE BUBBLE DIFFUSER AND DIFFUSER SYSTEM HAVING FILTERED BLOW-DOWN TUBE

[76] Inventor: Robert R. Tyer, 19 Crestwood, No. 2, Houston, Tex. 77007

[21] Appl. No.: 288,616

[22] Filed: Dec. 21, 1988

Related U.S. Patent Documents

Reissue of:

[64] Patent No.: 4,639,314
Issued: Jan. 27, 1987
Appl. No.: 692,919
Filed: Jan. 18, 1985

[51] Int. Cl.[5] ..... B01F 3/04

[52] U.S. Cl. ..... 210/220; 261/122; 261/DIG. 70

[58] Field of Search ..... 210/199, 220, 251, 295; 261/122, 124, DIG. 70

[56] References Cited

U.S. PATENT DOCUMENTS

| | | | |
|---|---|---|---|
| 302,326 | 7/1884 | d'Heureuse . | |
| 396,732 | 2/1932 | Hartley . | |
| 2,218,635 | 10/1944 | Borge | 261/122 |
| 2,754,264 | 7/1956 | Fischer | 210/26 |
| 2,825,541 | 3/1958 | Moll et al. | 261/29 |
| 2,970,731 | 7/1976 | Oksman | 261/122 |
| 3,235,234 | 2/1966 | Beaudoin | 261/24 |
| 3,416,776 | 12/1968 | Gamer | 261/122 |
| 3,490,752 | 1/1970 | Danjes et al. | 261/122 |
| 3,501,133 | 3/1970 | Dreier et al. | 261/124 |
| 3,575,350 | 4/1971 | Willinger | 239/145 |
| 3,644,231 | 2/1972 | Maruya et al. | 260/2.5 F |
| 3,650,405 | 3/1972 | Morrison | 210/241 |
| 3,683,627 | 7/1972 | Girdon | 210/167 |
| 3,768,788 | 10/1973 | Candel | 261/122 |
| 3,785,629 | 1/1974 | McKinney | 261/122 |
| 3,785,779 | 1/1974 | Li et al. | 261/124 X |
| 3,808,123 | 4/1974 | Neel | 210/199 X |
| 3,953,554 | 4/1976 | Loughridge | 261/124 |
| 3,956,432 | 5/1976 | Hilling | 261/122 X |
| 3,977,606 | 8/1976 | Wyss | 239/145 |
| 4,243,616 | 1/1981 | Wyss | 261/122 |
| 4,288,395 | 9/1981 | Ewing et al. | 261/122 |

OTHER PUBLICATIONS

"Nokia Diffusers for Waste Water Aeration" by Nokia Middle Industries.
"Wyss Flex-A-Tube Diffuser" by Parkson Corporation.
"Brown and Caldwell" Jan.-Mar. 1983.
"Engineering Data" by Endurex Corp.
"Dome Diffuser Aeration System", distributed by Norton Industrial Ceramics Division.

*Primary Examiner*—Tom Wyse
*Attorney, Agent, or Firm*—Daniel V. Thompson

[57] ABSTRACT

An improved fine bubble diffuser and diffuser system is provided. The diffuser includes a filtered blow-down tube for containing an internal gas pressure within the diffuser and allowing water to be removed from the system and further includes a filter disposed between the blow-down tube and the diffuser for filtering solids from water entering the diffuser.

34 Claims, 4 Drawing Sheets

FINE BUBBLE DIFFUSER AND DIFFUSER SYSTEM HAVING FILTERED BLOW-DOWN TUBE

Matter enclosed in heavy brackets [ ] appears in the original patent but forms no part of this reissue specification; matter printed in italics indicates the additions made by reissue.

TECHNICAL FIELD

This invention relates to aeration systems for wastewater treatment plants and the like and more particularly to an improvement in fine bubble gas diffusers and gas diffuser systems.

BACKGROUND ART

The use of aeration in the treatment of wastewater has increased considerably since the early 1950's. Aeration plants have been used extensively in the treatment of wastewater in small communities, shopping centers, schools and subdivisions. Developments in aeration equipment, in the past 25 years in general, have provided greater economy, ease of operations and maintenance of the systems. With these developments, increased loadings per tank volume have resulted in savings on both the original equipment purchase and the cost of daily operations.

Diffusers are devices that disperse air into the mixed liquor in the aeration or digestor tanks. These devices are classified as fine bubble (porous) and large bubble (nonporous) diffusers. Fine bubble diffusers come in the form of plates, domes or tubes and are constructed of ceramic, synthetic fabric or plastic material. Fine bubble diffusers emit air bubbles ranging from 2 to 5 mm in diameter. Large bubble diffusers may be of the nozzle, orifice, valve or shear type and are constructed of metal or plastic. These diffusers emit air bubbles in excess of 5 mm is diameter. A compressed air piping system with either fixed or retractable mountings is used to supply air to the diffusers.

Large Bubble Diffusers

The early diffuser device was an open ended pipe. Air was introduced into the mixed liquor of the aeration tanks. This device was improved upon and led to the development of more efficient large bubble diffusers.

The general statement, with few exceptions, can be made that large bubble diffusers get the job done. That is, with enough air pumped into the mixed liquor, one can obtain dissolved oxygen readings at satisfactory levels. However, at today's energy prices (cost per KWH), large bubble diffusers suffer from increased operational costs compared to other alternatives.

Fine Bubble Diffusers

The development of fine bubble diffusers began in the early 1900's with the objective of producing diffusers with improved air economy. One of the earlier fine bubble diffusers developed was simply a refinement of the original large bubble open ended pipe. This was accomplished by placing an end cap on the extended pipe and drilling many small holes through the sidewall of the pipe. This arrangement created smaller bubbles and a higher oxygen transfer efficiency. From then on, many fine bubbles diffusers were developed.

All types of fine bubble diffusers provide a greater air economy when compared to most large bubble air diffusers. Fine bubble diffusers, in general, have these notable features:

1. Drilled pipe with end cap. This was a refined version of the original large bubble diffusers and the oxygen transfer efficiency was greater. However, when the air supply was shut off for any reason, a back flow of sludge would get into the diffusers and cause plugging.
2. Ceramic plates and tubes. The transfer efficiency of these diffusers are much higher than the drilled pipe. In most cases plugging will occur with continued used and power outages. Required cleaning with acid and/or solvents often considered hazardous.
3. Synthetic fabric diffusers. The advantages and disadvantages of these diffusers compare well with the preceding diffusers with one exception—the fabrics plug and develop increased back pressure. To relieve the problem, the fabrics normally require semi-annual or quarterly removal and washing in an industrial type washing machine or replacement to retain their fine bubble efficiency.

The total rate of oxygen transfer for fine bubble air diffusers takes place in three phases:

Phase I. Bubble Formation

The oxygen transfer begins when small air bubbles (2–5 mm) are formed on the surface of the diffuser as the air is released. The total area of interfacial contact between the bubbles and the liquid is much greater for fine bubble diffusers. For a given volume of air, an increase in bubble size will decrease the amount of surface area for gas/liquid interface, because surface area is an inverse function of the cube of the diameter. If the diameter is reduced by a factor of 4, the surface area is increased by a factor of 64 for a given volume of air.

Phase II. Bubble Ascent to the Surface

The bulk of oxygen transfer takes place as the air bubble rises to the surface. The amount of oxygen transfer during this phase depends on the diffuser depth, the mean surface area of the total air bubbles and the rate of ascent to the surface. Due to the size of fine bubbles, the mean surface area will be greater than that for coarse bubbles and the rate of ascent to the surface will be slower. Rise rate is a function of the square of the diameter. If the bubble diameter is reduced by a factor of 4, the rise rate is reduced by a factor of 16. A greater surface contact and a longer period of contact time is available with fine bubbles for any given air flow per diffuser.

Phase III. Bubble Escape at Surface

The final stage of oxygen transfer takes place as the air bubble breaks through the liquid surface. Due to less required air flow, the size of the bubbles and the rate of ascent, the surface disturbance is negligible with fine bubble diffusers. Surface turbulence is not required for good oxygen transfer with fine bubble diffusers. However, with air flows of 10 to 15 SCFM per diffuser, surface turbulence becomes very visible.

Coarse bubbles disturb the free surface due to the velocity of ascent to the surface. If this disturbance is sufficient, oxygen will be absorbed by the liquid passing through the air above the water surface.

Factors effecting aeration system energy efficiency

The most efficient oxygen transfer environment is one that has zero residual oxygen (maximum driving force) and no requirement for mixing. The most efficient bubbler is the one that makes the smallest bubbles (maximum surface area) and keeps them the farthest apart (minimum interference).

Bubble size is a surface phenomenon and is a function of surface tension rather than media pore size. Simply stated, air will accumulate at the surface of the diffuser media until the bubble's bouyancy becomes large enough to escape the surface tension. For this reason, fine bubble media type, within limits, will generate bubbles of about the same size. The major variable is air flow rate, which must be low enough so that the bubbles generates will be far enough apart to minimize coalescence. The optimum shape for a diffuser is flat and horizontal, since this minimizes the likelihood of bubbles contacting one another and coalescing.

A second factor that varies with bubble size is the upward velocity (rise rate) of the bubble. A low rise rate allows more contact time between the bubble and liquid resulting in greater transfer efficiency.

Fine bubble transfer efficiencies vary widely with (1) air flow rate and (2) with layout of the diffusers within the basin. The most efficient media configuration within an aeration basin is full-floor coverage. This would allow low air flow per unit of media area. This low flow, in turn, would minimize coalescence.

In summary, the theoretically most energy efficient system would be a continuous fine bubble media over the floor of an aeration basin such that the media face is flat and the air flow rate is very low. The basin contents would have a residual dissolved oxygen content of near zero to maximize the driving force for dissolving oxygen.

Historical Perspective

Early fine bubble systems date back to around 1930. Many were designed, or were operated, with residual dissolved oxygen levels of below ½ ppm with the aim of maximizing transfer efficiency. However, the low residual created operational problems due to constantly changing plant loading and slime growth. Problems associated with variations in plant loading and slime are solved by operating with a residual of 1½ to 2 ppm. Another reason for operating at a higher residual is that nutrification can occur.

Early fine bubble projects used sintered aluminum oxide in square or rectangular plates as media. The plates were placed over depressions cast in the concrete basin floor to approach full floor coverage. Such configurations had several shortcomings:

1. The plates were brittle and were grouted in their concrete depressions. Both the plate and its grout support were subject to brittle failure such that air leaks occured and system efficiency was reduced.

2. The system required removal of all basin contents for even the most minor maintenance.

3. Sintered aluminum oxide can be manufactured to a minimum pore size of about 150 microns. These pore sizes allow air to flow through the media by gravitational forces alone at near-optimum flow rates. This means that the media operated at near zero pressure in the air plenum beneath the media plate. The low plenum pressure was not enough to distribute air throughout the system. As a result, the systems were operated at flow rates high enough to obtain air distribution pressures but too high for efficient oxygen transfer.

4. Sintered aluminum oxide plates cannot be manufactured with a high uniformity from one area of the plate to another. One current manufacturer claims that the resistance to flow varies between 80% and 120% of average. The result is that with large plates and low internal pressures, air will flow out of only that portion of the plate where it finds the least resistance. It is probable that low internal pressures allow water to simultaneously flow downward into the plenum while air flows upward through another portion of the plate.

5. Plate systems had no acceptance means for removing water from the plenum and air piping. Water could enter the plenum, to some extent, during operation, when the air supply stopped, or even through condensation. This water could not be removed, because plenum pressure was not sufficient to blow it out.

Currently Available Systems

Current fine bubble systems use a wide range of configurations and media, and their manufacturers recommend a wide range of basin layouts. As discussed above, the ideal system (1) has nearly flat horizontal surfaces and (2) approaches full-floor coverage. Both these criteria were discussed earlier as being requirements for a system with optimum energy efficiency.

The most common media in modern systems is still sintered aluminum oxide with pore sizes ranging from 150 to 200 microns and a uniformity of plus or minus 20%. Sintered plastics with improved uniformity and 70 to 100 micron pores are also being used in configurations essentially the same as those for sintered aluminum oxide. Headloss through the sintered plastics is greater than through the aluminum oxide, but is still not sufficient for effective distribution of air at the desired low flow rates. Sintered plastics with 20 micron pore sizes and high uniformity are now being manufactured but have not yet been used in air diffusers.

Current systems use a large number of small disks or domes attached to a grid of pipe to approximate full-floor coverage. The separate disks or domes have done away with problems associated with grouting and lack of uniformity in the older plates. Internal pressures are still too low to distribute air, but internal orifices partially solve this problem. Water still enters the piping system and internal pressures are still not sufficient to remove it. It should be noted that orifices sized to induce headloss at the typical flow rates of about 0.75 to 1.50 CFM per diffuser would be much too small for use in the diffuser systems.

No current fine bubble systems use a blow-down assembly for removal of internal water, because unfiltered blow-down assemblies would allow solids to enter the diffuser when air pressures are reduced. Solids within fine bubble diffusers are known to plug the diffuser media.

A common problem with all systems currently marketed for full-floor coverage is the removal of water from the piping system. An internal pressure of about 10 inches water column would achieve effective air distribution across the system and would allow effective blow-down of internal water. However, currently available systems do not operate at these pressures due to restrictions inherent to the media used. Furthermore, no systems are currently available to allow the effective removal (blow-down) of internal water while containing internal pressures on the order of 10 inches water column.

SUMMARY OF THE INVENTION

The present invention provides a new and useful immprovement in fine bubble diffuser systems by providing a filtered blow-down tube associated with the system for containing an internal pressure within the diffuser to evenly distribute air, for allowing water within the system to escape, and for screening solids from entering the diffuser when it is not in operation.

BRIEF DESCRIPTION OF THE DRAWINGS

A more complete understanding of the invention and its advantages will be apparent from the Detailed Description taken in conjunction with the accompanying Drawings in which.

DETAILED DESCRIPTION

Figure 1:
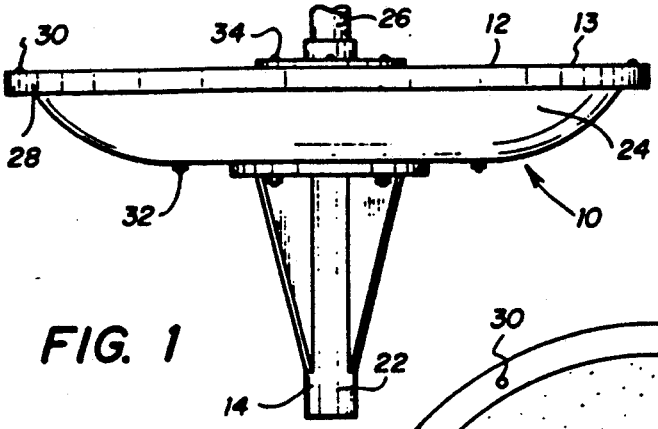
FIG. 1 is a side view of a diffuser of the present invention.
Figure 2:
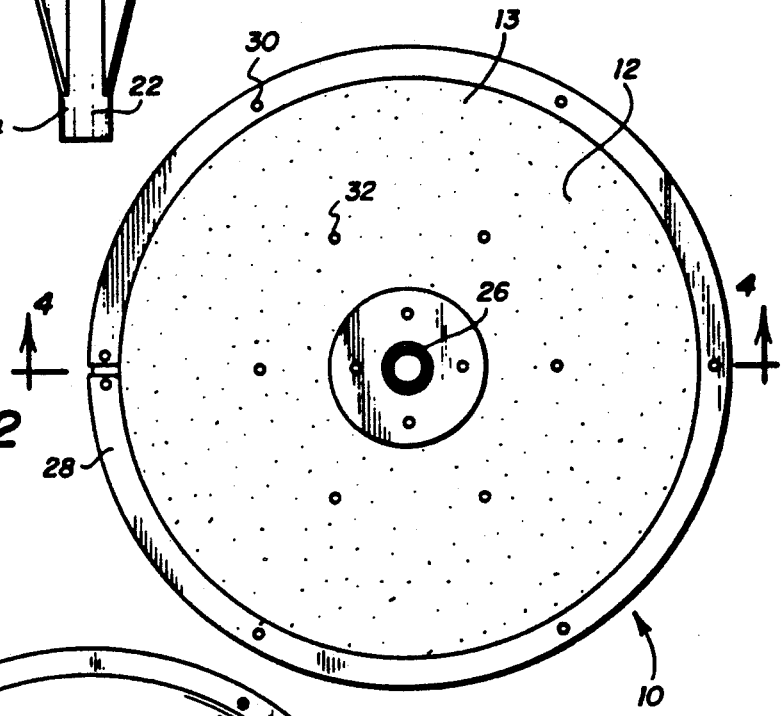
FIG. 2 is a top view of the diffuser of FIG. 1.
Figure 3:
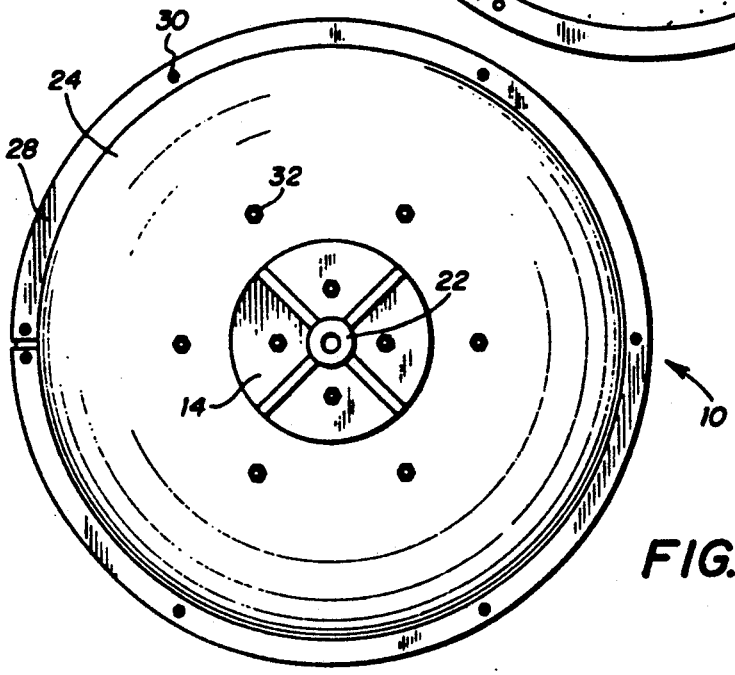
FIG. 3 is a bottom view of the diffuser of FIG. 1.
Figure 4:
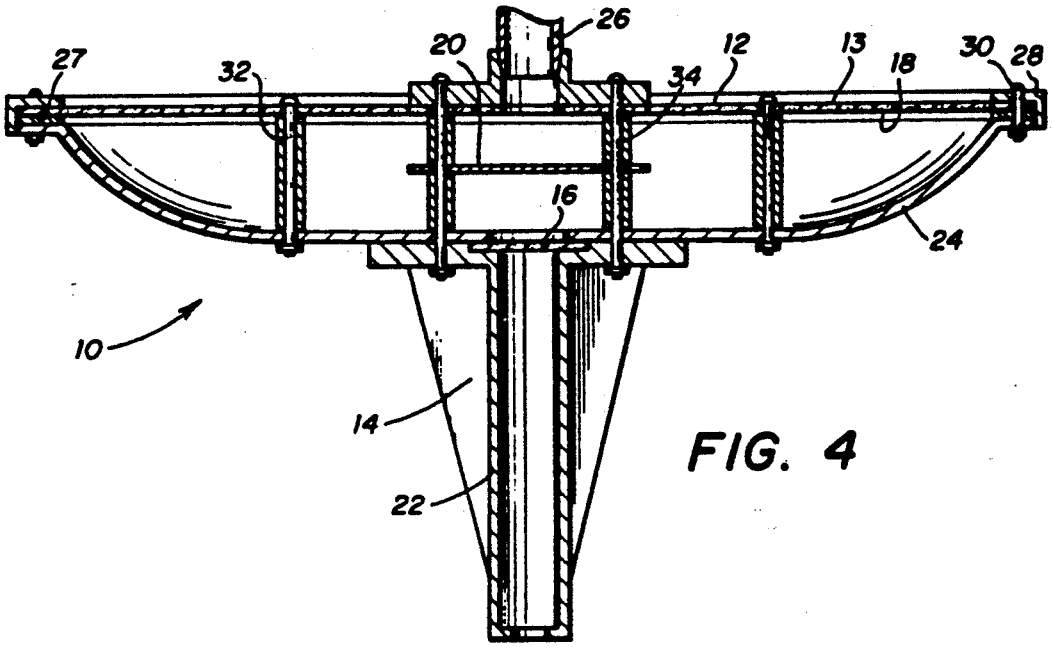
FIG. 4 is a sectional view taken along lines 4—4 of FIG. 2.

Referring initially to FIGS. 1–4, gas diffuser 10 comprises a large flat surface element 12 of porous media 13 capable of separating a gas flow into fine bubbles while maintaining sufficient internal pressure to distribute the gas uniformly through a multi-diffuser system. A filtered blow-down tube assembly 14 is provided such that liquid entering the diffuser 10 passes through a filter 16 to remove materials which might plug the inside surface 18 of the diffuser media 13. An internal baffle 20 assures distribution of gas inside the diffuser 10. Drop pipe 22 of assembly 14 allows liquid to escape from the diffuser 10 but does not allow gas to escape at normal operating pressure. A containment and support vessel 24 is configured to allow gas to be supplied to each diffuser 10 by a single pipe 26 extending to the surface of the liquid. The individual supply pipes 26, when properly valved, allow individual diffusers 10 to be retrieved for service without interrupting operation of adjacent diffusers.

Surface element 12 is a porous near-flat plate or sheet whose effective bubble generating surface is horizontal such that all bubble generation points are nearly the same distance below the water surface. The media 13 can be any material capable of generating small bubbles and maintaining an internal pressure of approximately 8 to 10 inches water column at operating air flow rates. The shape of the media 13 (horizontal projection) may be circular, square, hexagonal, octagonal or any other shape. The area of the bubble generating surface of media element 12 can be any size. In the preferred embodiment, surface element 12 is a 24-inch diameter flat sheet of ⅛-inch sintered plastic having an average pore size of 20 microns. The preferred embodiment operates at a gas flow rate of between 8 to 12 standard cubic feet per minute per square foot of media area (SCFM/ft$^2$).

Containment and support vessel 24 supports the components of the diffuser 10. Vessel 24 may be constructed of fiberglass, stainless steel or any impervious material of sufficient strength. Vessel 24 has an open top shaped to outline surface element 12. The depth of vessel 24 is sufficient to allow distribution of internal air. Holes are formed in the bottom of vessel 24 to allow connection to the blow-down assembly 14 as well as a bottom air supply connection if applicable. The preferred embodiment includes a 24-inch diameter, 2½-inch deep vessel 24 stamped from 16 gauge type 304 stainless steel including a ¾-inch flange around the outer rim. Surface element 12 is sealed against the outer rim of vessel 24 by a gasket 27, a Type 304 Stainless Steel rim angle 28 and bolts 30. The vessel 24 contains internal bolt and spacer supports 32 to rigidly support the surface element 12 as required.

Tube 22 is attached to the bottom of the diffuser vessel 22 with an open bottom to allow escape of water from the diffuser 10. The opening must be a sufficient vertical distance below the surface of surface element 12 to avoid the release of air when internal pressure in the diffuser 10 is at operating pressure. The tube 22 contains a filter 16 having pore sizes equal to or greater than the media 13. The filter 16 is arranged and installed such that any water of air traveling into or out of the diffuser vessel 22 must travel through the filter 16 or the media 13. In the preferred embodiment, blow-down tube assembly 14 includes a vertical 1½-inch tube 22 with a filter 16 of 70 micron pore size sintered plastic gasketed between the top of the tube 22 and the bottom of the diffuser vessel 12. The bottom of the tube 22 is 15 inches below surface element 12. The assembly 14 is located off center when the diffuser air supply pipe 26 enters from the bottom. When the air supply pipe enters the diffuser from the top, as shown in FIGS. 1–4, the tube assembly 14 may be configured to serve other functions such as support legs or weight or overcom bouyancy.

Normal internal operating pressure will be sufficient to distribute air to all points on the media 13 equally. However, an internal baffle 20 is preferred to avoid impact of entering air directly on diffuser media 13 when entrance is from the bottom or avoid impact of entering air on the filter 16 when entrance is from the top. In the preferred embodiment, internal baffle 20 comprises a circular plate of 16 gauge Type 304 stainless steel supported horizontally in the center of the diffuser vessel 24 by bolt and spacer assemblies 34.

Figure 5A:
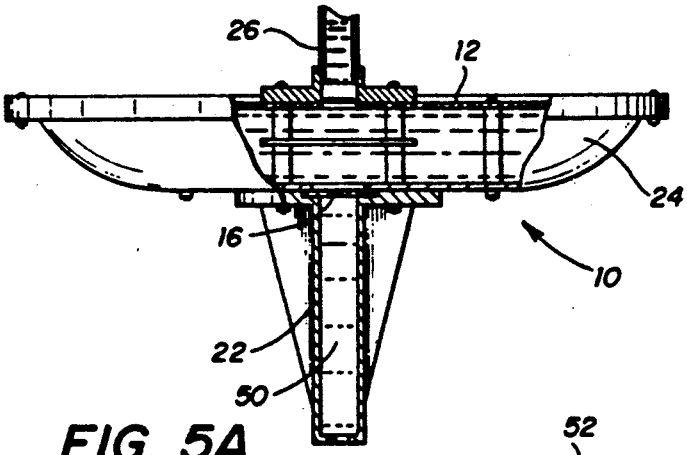
FIG. 5A is a partially broken away side view of a diffuser not in operation.
Figure 5B:
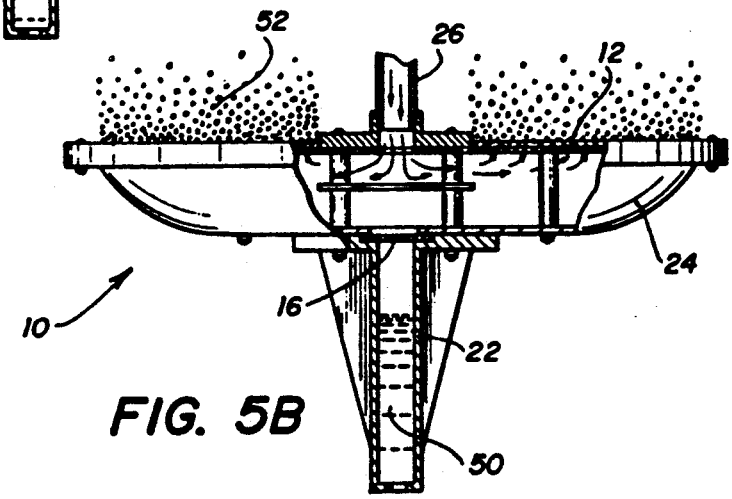
FIG. 5B is a partially broken away side view of a diffuser in operation.

In operation, as illustrated in FIGS. 5A and 5B, diffuser 10 will fill with water 50 when the air supply is shut off for any reason. Water enters diffuser 10 either through media 13 or 22, and filter 16 and rises through vessel 24 and up pipe 26 to the level of the tank. An important feature of the invention is the filter 16, which prevents solids in water 50 from entering vessel 24 when the air supply is discontinued. Without filter 16, solids would enter vessel 24 and clog media 13 when air supply was resumed.

As shown in FIG. 5B, when air is supplied to the diffuser, pressure within vessel 24 increases until it is sufficient to enable the release of bubbles 52. Leg 22 is of a sufficient length to enable the level of water 50 therein to be lowered to a point above the open end of tube 22. The internal pressure of diffuser 10 is thereby maintained at any preselected level.

The combination of blow-down assembly 14 and filter 16 enables the use of media 13 having properties which allow the use of relatively large areas of porous fine bubble-generating diffuser media. The invention solves two important problems that have substantially inhibited the efficient use of porous fine bubble diffusers in the past. The use of a blow-down assembly 14 allows the use of media which can operate at relatively high pressures within the vessel 24, such that media 13 generates evenly distributed bubbles and air is distributed throughout a multi-diffuser system. Filter 16 solves the problem of the porous media clogging up after shut downs, a problem that has plagued prior art fine bubble systems with high maintenance costs due to the need for frequent removal and cleaning of the diffusers.

Figure 6:
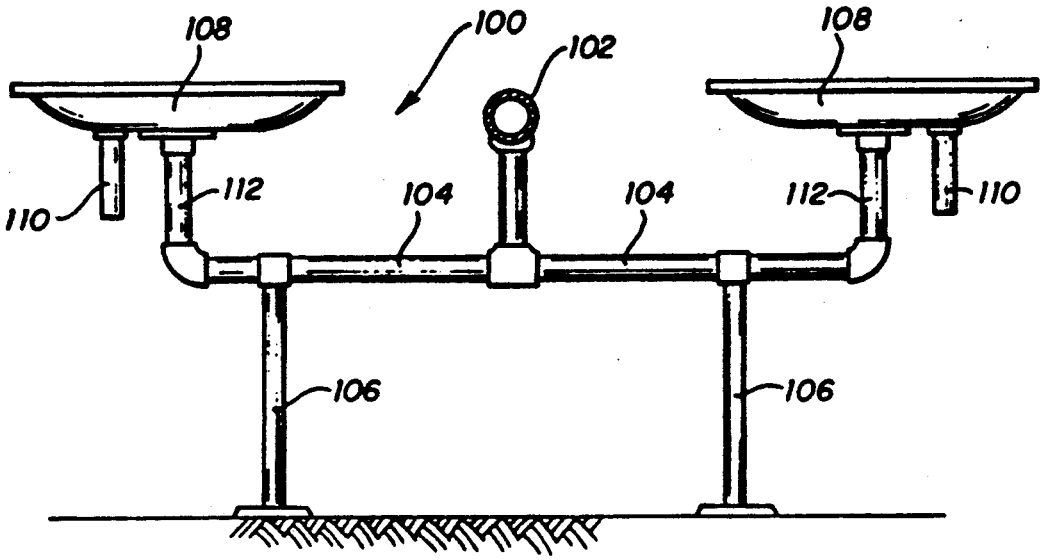
FIG. 6 is a side view of a first alternate embodiment of the invention.

Referring now to FIG. 6, an alternate embodiment of the invention is illustrated. Diffuser system 100 includes air supply pipe 102, branch pipes 104 and supports 106. Diffusers 108 are constructed in accordance with the above description, except filtered blow-down assemblies 110 are located off center, and gas inlet pipes 112 enter through the bottom of diffusers 108. While the embodiment described in connection with the previous figures is preferred, the embodiment shown in FIG. 6 allows adaptation of my improved diffusers in systems having floor mounted piping and support systems similar to the one illustrated in FIG. 6. The operation of the alternate embodiment is substantially the same as that described above.

Figure 7:
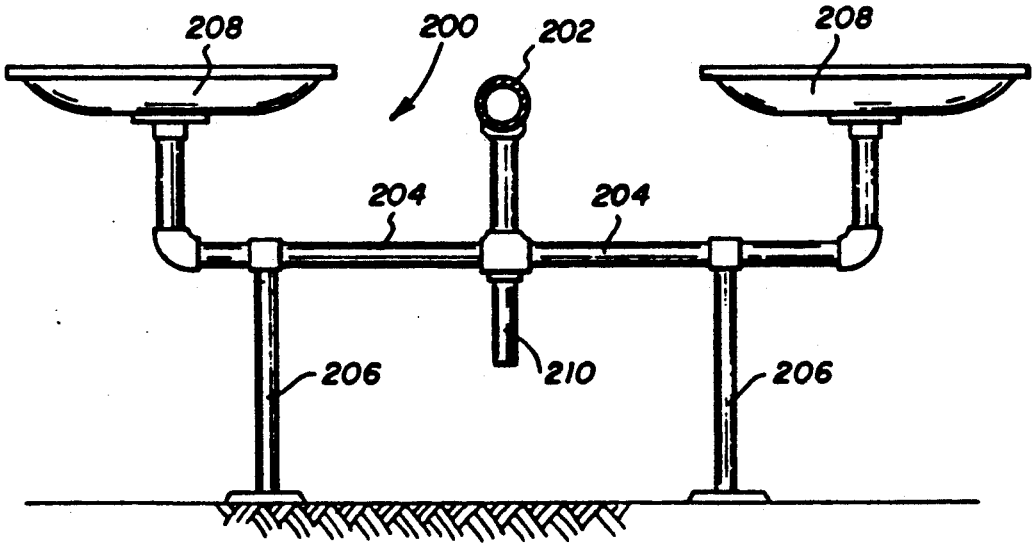
FIG. 7 is a side view of a second alternate embodiment of the invention.

A second alternate embodiment of my invention is shown in FIG. 7. System 200 includes gas supply pipe 202, branch pipes 204 and supports 206. Diffusers 208 are constructed as described above, except that the filtered blow-down assemblies are omitted. Instead, a filtered blow-down assembly 210 is connected to a portion of the piping system for the diffusers and operates in the same manner as described above.

Figure 8:
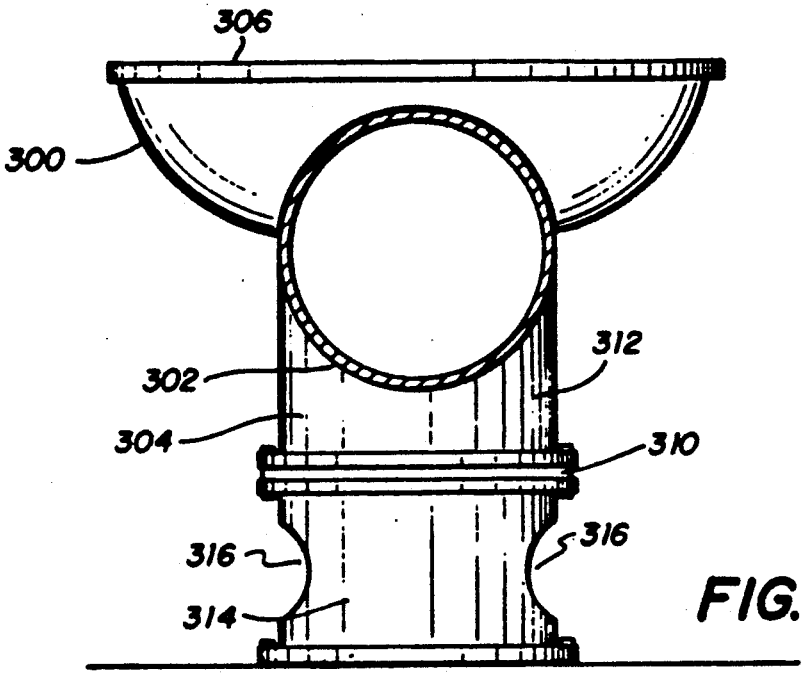
FIG. 8 is a side view of a third alternate embodiment of the invention.
Figure 9:
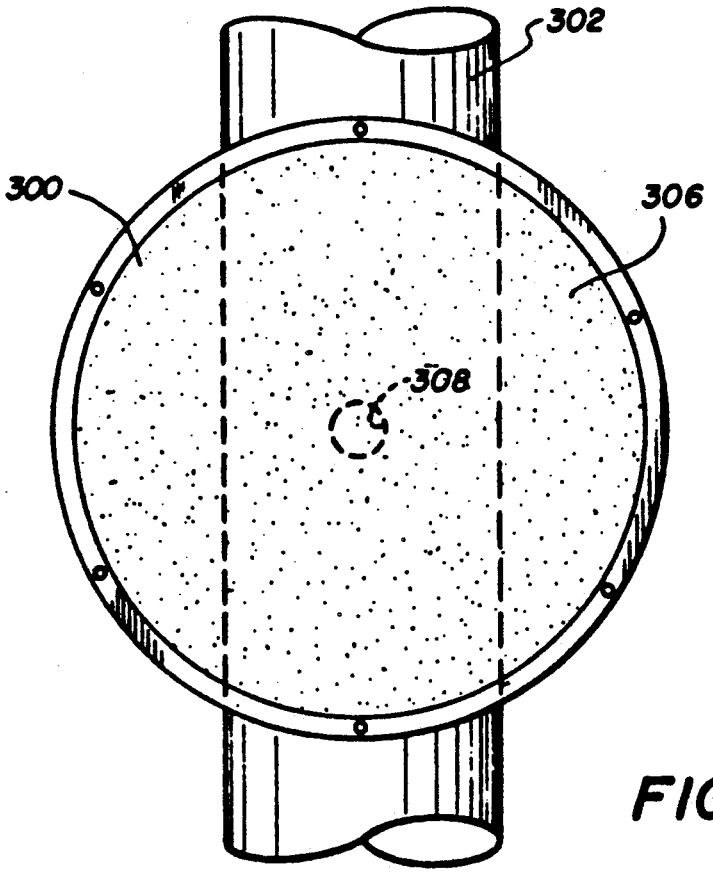
FIG. 9 is a top view of the third alternate embodiment of FIG. 8.

Referring now to FIG. 8 and FIG. 9, a third alternate embodiment of the invention is illustrated wherein the diffuser vessel 300 is reduced in size and sealingly mounted directly to the air feed pipe 302 which is mounted on the floor. Blow-down assembly 304 also functions as a floor support for the diffuser vessel 300. Diffuser vessel 300 is attached to surface element 306 at the periphery thereof. As shown in FIG. 9, air feed pipe 302 communicates with diffuser vessel through air hole 308. Blow-down assembly 304 includes filter 310 between upper and lower tube sections 312 and 314. Water release holes 316 are provided in lower tube section 314 to enable release of water from the system.

While particular embodiments of the present invention have been described in detail herein and shown in the accompanying Drawings, it will be evident that various further modifications are possible without departing from the scope of the invention.

I claim:

1. In a gas diffuser system for a vessel having at least one gas diffuser element connected to a gas supply pipe, the improvement comprising:

(a) At least one tube connected to the system, the tube extending in a downward direction from the system and having an opening to the vessel located in predetermined distance below the level of the diffuser element, and the tube communicating with the system through an upper end; and (b) a filter extending across the tube and having pores sized to exclude from the interior portions of the system solid material suspended in liquid material entering the tube through its opening to the vessel.

2. A gas diffuser for use in wastewater vessels and the like comprising:

(a) a diffuser body having at least one fine bubble generating surface;

(b) a tube extending downwardly from and communicating with the diffuser body at its upper end and having an opening to the vessel located a predetermined distance below the fine bubble generating surface; and (c) a filter extending across the tube and having pores sized to exclude from the interior portions of the diffuse body solid material suspended in liquid material entering the tube through its opening to the vessel.

3. The gas diffuser of claim 2 wherein the bubble generating surface is the top surface of a near-flat, horizontally disposed, porous element.

4. The gas diffuser of claim 3 wherein the tube has a lower, open end located below the fine bubble generating surface at a distance sufficient to contain a positive gas pressure within the diffuser body thereby enabling uniform distribution of gas while allowing water to escape from the diffuser body.

5. The gas diffuser of claim 4 wherein the tube is connected to the bottom portion of the diffuser body.

6. The diffuser of claim 5 wherein the diffuser body is a concave-upwardly bowl-shaped vessel that is sealingly attached to the surface element at the periphery of the surface element.

7. The diffuser of claim 2 further comprising means for connecting the interior of the diffuser body to a gas supply pipe.

8. The diffuser of claim 7 further comprising baffle means within the diffuser body for arresting and displacing gas entering the body from the gas supply pipe.

9. A gas diffuser comprising:

(a) a near-flat, horizontally-disposed, porous surface element for generating fine bubbles, the surface element having pores having an average size of less than 200 microns;

(b) a containment and support vessel having a concave-upwardly bowl-shaped bottom member sealingly attached to the porous surface element at the periphery thereof;

(c) means for connection to a gas supply pipe attached to the diffuser and communicating with the interior of the containment and support vessel through and inlet opening therein;

(d) a baffle member disposed within the containment and support vessel and spaced apart from the inlet opening, the baffle member being sized with respect to the inlet opening such that incoming gas is arrested and displaced throughout the vessel;

(e) a blow-down tube attached to and extending downwardly from the containment and support vessel having a predetermined length sufficient to contain a positive gas pressure within the containment and support vessel and enable uniform gas distribution across the system; and (f) a porous filter having pores of an average size less than the average pore size of the surface element and disposed within the blow-down tube to filter liquid entering the containment and support vessel through the blow-down tube.

10. The diffuser of claim 9 wherein the means for connection is attached the surface element, and the blow-down tube extends downwardly from the containment and support vessel.

11. The diffuser of claim 10 wherein the baffle means is a baffle plate supported within the containment and support member parallel to the porous surface element.

12. The diffuser of claim 9 wherein the filter is a disk-shaped element manufactured from sintered plastic material and is constrained between the bottom of the containment and support vessel and the top of the blow-down tube, and the surface element is a disk-shaped element manufactured from plastic material.

*13. In a gas diffuser system for a vessel having at least one gas diffuser element connected to a gas supply pipe, the improvement comprising:*

*At least one tube connected to the system, the tube extending in a downward direction from the system and having an opening to the vessel located a predetermined distance below the level of the diffuser element, and the tube communicating with the system through an upper end; and means extending across the tube for excluding from the interior portions of the system solid material suspended in liquid material entering the tube through its opening to the vessel.*

*14. A gas diffuser for use in wastewater vessels and the like comprising:*

*(a) a diffuser body having at least one fine bubble generating surface;*

*(b) a tube extending downwardly from and communicating with the diffuser body at its upper end and having an opening to the vessel located a predetermined distance below the fine bubble generating surface, and*

*(c) means extending across the tube for excluding from the interior portions of the diffuser body solid material suspended in liquid material entering the tube through its opening to the vessel.*

*15. The gas diffuser of claim 14 wherein the bubble generating surface is the top surface.*

*16. The gas diffuser of claim 15 wherein the tube has a lower, open end located below the fine bubble generating surface at a distance sufficient to contain a positive gas pressure within the diffuser body thereby enabling uniform distribution of gas while allowing water to escape from the diffuser body.*

*17. The gas diffuser of claim 16 wherein the tube is connected to the bottom portion of the diffuser body.*

*18. The diffuser of claim 17 wherein the diffuser body is sealingly attached to the surface element at the periphery of the surface element.*

*19. The diffuser of claim 14 further comprising means for connecting the interior of the diffuser body to a gas supply pipe.*

*20. The diffuser of claim 19 further comprising baffle means within the diffuser body for arresting and displacing gas entering the body from the gas supply pipe.*

*21. A gas diffuser comprising:*

*(a) a near-flat, horizontally-disposed, porous surface element for generating fine bubbles, the surface element having pores having an average size of less than 200 microns;*

*(b) a containment and support vessel having a concave-upwardly bowl-shaped bottom member sealingly attached to the porous surace element at the periphery thereof;*

*(c) means for connection to a gas supply pipe attached to the diffuser and communicating with the interior of the containment and support vessel through and inlet opening therein;*

*(d) a baffle member disposed within the containment and support vessel and spaced apart from the inlet opening, the baffle member being sized with respect to the inlet opening such that incoming gas is arrested and displaced throughout the vessel;*

*(e) a blow-down tube attached to and extending downwardly from the containment and support vessel having a predetermined length sufficient to contain a positive gas pressure within the containment and support vessel and enable uniform gas distribution across the system; and*

*(f) means disposed within the blow-down tube for preventing solids from entering the containment and support vessel through the blow-down tube.*

*22. The diffuser of claim 21 wherein the means for connection is attached to the surface element, and the blow-down tube extends downwardly from the containment and support vessel.*

*23. The diffuser of claim 22 wherein the baffle means is a baffle plate supported within the containment and support member parallel to the porous surface element.*

*24. In a gas diffuser system for a vessel having at least one gas diffuser element connected to a gas supply pipe, the improvement comprising:*

*at least one tube connected to the system, the tube extending in a downward direction from the system and having an opening to the vessel located a predetermined distance below the level of the diffuser element, and the tube communicating with the system through an upper end; and an exclusion element operable to exclude from the interior portions of the system solid material suspended in liquid material entering the tube through its opening to the vessel.*

*25. A gas diffuser for use in wastewater vessels and the like comprising:*

*(a) a diffuser body having at least one fine bubble generating surface;*

*(b) a tube extending downwardly from and communicating with the diffuser body at its upper end and having an opening to the vessel located a predetermined distance below the fine bubble generating surface, and*

*(c) an exclusion element operable to exclude from the interior portions of the diffuser body solid material suspended in liquid material entering the tube through its opening to the vessel.*

*26. The gas diffuser of claim 25 wherein the bubble generating surface is the top surface.*

*27. The gas diffuser of claim 26 wherein the tube has a lower, open end located below the fine bubble generating surface at a distance sufficient to contain a positive gas pressure within the diffuser body thereby enabling uniform distribution of gas while allowing water to escape from the diffuser body.*

*28. The gas diffuser of claim 27 wherein the tube is connected to the bottom portion of the diffuser body.*

*29. The diffuser of claim 28 wherein the diffuser body is sealingly attached to the surface element at the periphery of the surface element.*

*30. The diffuser of claim 25 further comprising means for connecting the interior of the diffuser body to a gas supply pipe.*

*31. The diffuser of claim 30 further comprising baffle means within the diffuser body for arresting and displacing gas entering the body from the gas supply pipe.*

*32. A gas diffuser comprising:*

*(a) a near-flat, horizontally-disposed, porous surface element for generating fine bubbles, the surface ele-*

*ment having pores having an average size of less than 200 microns;*

*(b) a containment and support vessel having a concave-upwardly bowl-shaped bottom member sealingly attached to the porous surface element at the periphery thereof;*

*(c) means for connection to a gas supply pipe attached to the diffuser and communicating with the interior of the containment and support vessel through and inlet opening therein;*

*(d) a baffle member disposed within the containment and support vessel and spaced apart from the inlet opening, the baffle member being sized with respect to the inlet opening such that incoming gas is arrested and displaced throughout the vessel;*

*(e) a blow-down tube attached to and extending downwardly from the containment and support vessel having a predetermined length sufficient to contain a positive gas pressure within the containment and support vessel and enable uniform gas distribution across the system; and*

*(f) an exclusion element operable to prevent solids from entering the containment and support vessel through the blow-down tube.*

*33. The diffuser of claim 32 wherein the means for connection is attached to the surface element, and the blow-down tube extends downwardly from the containment and support vessel.*

*34. The diffuser of claim 33 wherein the baffle means is a baffle plate supported within the containment and support member parallel to the porous surface element.*

* * * * *